United States Patent Office 3,637,809
Patented Jan. 25, 1972

3,637,809
ANTIOXIDANTS
Eduard K. Kleiner, Dobbs Ferry, N.Y., assignor to Ciba-Geigy Corporation, Ardsley, N.Y.
No Drawing. Filed July 5, 1968, Ser. No. 742,701
Int. Cl. C07c *149/00*
U.S. Cl. 260—479 S
9 Claims

ABSTRACT OF THE DISCLOSURE

Organic materials, particularly synthetic polymers such as polypropylene are protected against oxidation in air, thermal degradation or deterioration by including, in such substances, a stabilizing amount of antioxidant. The antioxidant is obtained by reacting (a) an α,β-unsaturated ester of a hindered hydroquinone and (b) hydrogen sulfide or a mercaptan.

DETAILED DISCLOSURE

The present invention is concerned with novel compounds which are useful as antioxidants for organic materials and particularly, as antioxidants for synthetic polymers such as, for example, polypropylene, polyethylene, polystyrene, polyvinyl chloride, nylon and other polyamides, polyesters, cellulosics, polyacetals, polyurethanes, petroleum and wood resins, mineral oils, animal and vegetable fats, waxes, rubbers such as styrene-butadiene rubber (SBR), acrylonitrile-butadiene-styrene rubber (ABS), olefin-copolymers, ethylene-vinyl-acetate copolymers, polycarbonates, polyacrylonitrile, poly (4-methyl pentene-1) polymers, polyoxymethylenes, and the like. The present invention also relates to a novel procedure for preparing the aforesaid novel antioxidants and to stabilized compositions containing said novel antioxidants.

The prevention of oxidation of various organic materials is obviously of primary industrial concern and, therefore, antioxidants are used in or added to a wide variety of commercial products such as synthetic polymers of the type indicated supra, oils, plastic materials, etc., which are normally subject to oxidative deterioration.

The novel antioxidants of the present invention are represented by the following formulae:

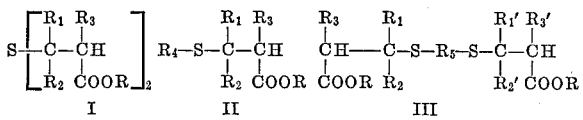

wherein R is

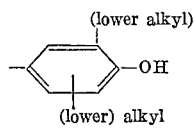

$R_1$, $R_2$, $R_3$
$R_1'$, $R_2'$, $R_3'$ are each —H, lower alkyl, phenyl, aralkyl or —$C_mH_{2m}COOR$ where $m$ is 0 to 6 (preferably 0 to 1); $R_4$ is —$C_nH_{2n+1}$ where $n$ is 1 to 24 (preferably 8 to 18 or mixtures thereof), cyclohexyl, phenyl, aralkyl, or —$(CH_2)_y$—COO—alkyl —phenyl or —aralkyl, where $y$ is 1 or 2; $R_5$ is —$C_nH_{2n}$ where $n$ is 2 to 12,

—$CH_2CH_2OCH_2CH_2$—, —$CH_2CH_2$—S—$CH_2CH_2$—

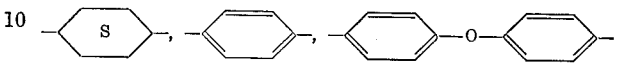

or

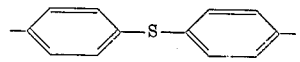

with the proviso that in compounds of Formulae I and II supra, at least one of the substituents $R_1$, $R_2$ or $R_3$ must be —$C_mH_{2m}COOR$ and in compounds of Formula III supra, at least one of the substituents $R_1$, $R_2$, $R_3$, $R_1'$, $R_2'$ or $R_3'$ must be —$C_mH_{2m}COOR$, where $R_1$, $R_2$, $R_3$, $R_1'$, $R_2'$, $R_3'$, R and $m$ are as defined above.

As used herein, alkyl is meant to cover groups containing from 1 to 24 carbon atoms; lower alkyl covers groups containing 1 to 6 carbon atoms, alkoxy covers groups containing from 1 to 4 carbon atoms. Further, the phenyl group referred to above may be substituted by a halogen (chlorine or bromine), alkyl, alkoxy, hydroxy, alkylthio or a carboalkoxy group. Aralkyl is meant to cover a group such as benzyl which may be substituted by a halogen (chlorine or bromine), alkyl, alkoxy, hydroxyl, alkylthio or a carboalkoxy group.

The novel antioxidants of the present invention are addition products of (a) an α,β-unsaturated ester of a hindered hydroquinone of the formula

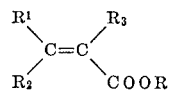

and (b) hydrogen sulfide or a mercaptan of the formula $R_4$—SH or HS—$R_5$—SH, wherein R, $R_1$, $R_2$, $R_3$, $R_4$ and $R_5$ are as described above.

The addition reaction involving hydrogen sulfide or a mercaptan compound with the α,β-unsaturated ester is effected in the presence of catalytic amounts (0.01 to 2%) of a base at temperatures varying from room temperature up to an elevated temperature. The preferred bases are alkoxides such as sodium or potassium methoxide or sodium or potassium ethoxide, piperidine, pyridine or benzyltrimethylammonium hydroxide. It is also possible to catalyze the addition reaction by the use of a free-radical initiator such as an azo compound and particularly an azonitrile compound or an aliphatic peroxide of the type described in applicant's copending application entitled Polymeric Antioxidants Ser. No. 738,770, filed June 21, 1968, now abandoned.

Specific procedures used for preparing the desired antioxidants will vary depending upon either the product desired or the hydrogen sulfide or the mercaptan which is used in the addition reaction. One procedure which is used in preparing antioxidants represented by Formulae II and III (symmetrical only) supra, i.e., Method (a), involves dissolving equimolar amounts of the $\alpha,\beta$-unsaturated ester and mercaptan in a solvent such as benzene or chloroform together with 1% by weight (based on the ester and mercaptan) of a 35% (by weight) solution of benzyltrimethylammonium hydroxide in methanol. The reaction is exothermic and cooling may be necessary. After standing several hours at room temperature (or alternatively heating in reaction mixture to a temperature between 60 and 80° C. for a period of about 20 to 60 minutes), the base is neutralized with an equivalent of acetic acid. After evaporation of the solvent, the product is either distilled or crystallized. The yields in all cases are excellent that is, in excess of 90%.

A second reaction procedure which can be used to prepare unsymmetrical antioxidants represented by Formula III supra and exemplified by compounds F and G supra, involves adding, to a solution of 5-10 moles of a dimercaptan of the formula $HS-R_5-SH$, as indicated supra, in chloroform and 1% benzyltrimethylammonium hydroxide (in a 35% solution in methanol) a solution of 1 mole of the $\alpha,\beta$-unsaturated ester of a hindered hydroquinone in chloroform. After standing for several hours at room temperature, the base is neutralized with acetic acid. The solvent and excess dimercaptan are distilled off and the crude intermediate is recrystallized. The addition of the second $\alpha,\beta$-unsaturated ester of a hindered hydroquinone is carried out as described under Method (a).

The procedures for preparing the desired products of the present invention referred to as Methods (a) and (b) supra are the preferred methods for synthesizing the novel antioxidants. However, it is also possible to add first the mercaptan or hydrogen sulfide to the $\alpha,\beta$-unsaturated acid followed by esterifying the intermediate with the hindered hydroquinone. This procedure is preferred for preparing antioxidants of the formula

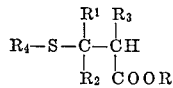

where $R_4$ is $-(CH_2)_y-COOR$, where $y$ is 1 or 2 and $R, R_1, R_2$ and $R_3$ are as defined above.

This procedure is illustrated by the following equations:

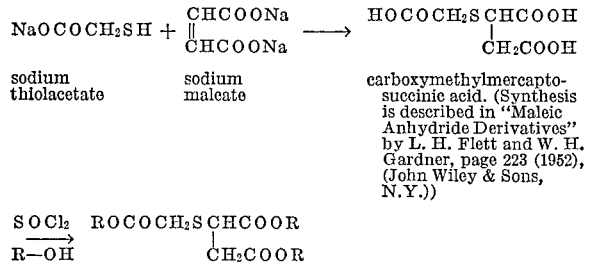

sodium thiolacetate    sodium maleate    carboxymethylmercaptosuccinic acid. (Synthesis is described in "Maleic Anhydride Derivatives" by L. H. Flett and W. H. Gardner, page 223 (1952), (John Wiley & Sons, N.Y.))

When hydrogen sulfide is included in the addition reaction to give antioxidants represented by Formula I supra, hydrogen sulfide is bubbled through a solution of the $\alpha,\beta$-unsaturated ester and the 0.1 to 2% trimethylbenzylammonium hydroxide or sodium methoxide solution (based on the $\alpha,\beta$-unsaturated ester) in chloroform at temperatures between 30° and 60° C. The reaction is exothermic and is stopped when no more hydrogen sulfide is absorbed. The work-up procedure is similar to that described in the Method (a) above.

Illustrative $\alpha,\beta$-unsaturated esters used in preparing the desired antioxidants of the present invention as indicated above, are represented by the following formula:

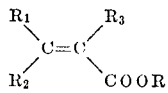

wherein R is

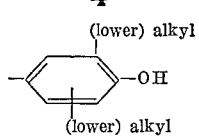

and $R_1$, $R_2$ and $R_3$ are as defined above.

Examples of such esters are:

| Esters of— | $R_1$ | $R_2$ | $R_3$ |
|---|---|---|---|
| Acrylic acid | —H | —H | —H |
| Methacrylic acid | —H | —H | —CH$_3$ |
| Crotonic acid | —CH$_3$ | —H | —H |
| Cinnamic acid | —C$_6$H$_5$ | —H | —H |
| Fumaric acid | —COOR | —H | —H |
| Maleic acid | —H | —COOR | —H |
| Mesaconic acid | —COOR | —H | —CH$_3$ |
| Citraconic acid | —H | —COOR | —CH$_3$ |
| Itaconic acid | —H | —H | —CH$_2$COOR |
| Aconitic acid | —COOR | —H | —CH$_2$COOR |

The preferred $\alpha,\beta$-unsaturated esters are esters of fumaric and itaconic acid.

Preferred mercaptan compounds used in preparing the antioxidants of the present invention are alkyl mercaptans containing from 8 to 18 carbon atoms; alkanedithiols containing from 2 to 10 carbon atoms; 2,2'-oxydiethanethiol, 2,2'-thiodiethanethiol, and the like.

Some of the preferred starting $\alpha,\beta$-unsaturated ester compounds used in preparing the antioxidant compounds of the present invention are as follows:

(I) 3,5-di-tert-butyl-4-hydroxyphenyl acrylate $$CH_2=CH-COO-R_0$$

(II) Bis(3,5-di-tert-butyl-4-hydroxyphenyl) fumarate

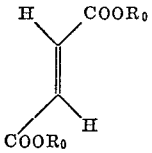

(III) Bis(3,5-di-tert-butyl-4-hydroxyphenyl) itaconate

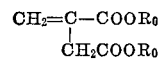

wherein $R_0$ is

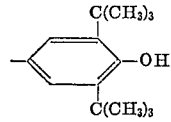

The aforesaid $\alpha,\beta$-unsaturated esters (identified above as compounds I, II and III) are reacted with the following mercaptan compounds:

| Compound: | Structural formula |
|---|---|
| (IV) n-octyl mercaptan | C$_8$H$_{17}$SH |
| (V) n-dodecyl mercaptan | C$_{12}$H$_{25}$SH |
| (VI) n-octadecyl mercaptan | C$_{18}$H$_{37}$SH |
| (VII) 3-phenylpropyl mercaptan | C$_6$H$_5$(CH$_2$)$_3$SH |
| (VIII) 1,2-ethanedithiol | HSCH$_2$CH$_2$SH |
| (IX) 1,4-butanedithiol | HS(CH$_2$)$_4$SH |
| (X) 1,8-octanedithiol | HS(CH$_2$)$_8$SH |
| (XI) 2,2'-oxydiethanethiol | (HSCH$_2$CH$_2$)$_2$O |
| (XII) 2,2'-thiodiethanethiol | (HSCH$_2$CH$_2$)$_2$S |

In the following table, Table I, the addition of the mercaptan to the $\alpha,\beta$-unsaturated ester is carried out by the procedure set out according to Method (a) supra. The purity of all antioxidants was checked either by TLC (thin layer chromatography) or VPC (vapor phase chromatography) and the structure was confirmed by IR (infrared) and NMR (nuclear magnetic resonance). Elemental analysis, melting and boiling points are listed below in Table I. The antioxidant products are identified below Table I, by structural formula as well as by the actual name of the product.

TABLE I.—PROPERTIES AND ANALYSIS OF NOVEL ANTIOXIDANTS

| Product | Appearance | Melting point (° C.) (crystallized from) | Elemental analysis | | | | | | Starting material |
|---|---|---|---|---|---|---|---|---|---|
| | | | Calculated | | | Found | | | |
| | | | C | H | S | C | H | S | |
| A | White powder. | 87–89° (heptane) | | | | | | | II plus IV. |
| B | do | 76–80° (heptane) | | | | | | | III plus IV. |
| C | do | 41–51° (hexane) | 73.00 | 9.46 | 4.65 | 73.37 | 8.73 | 4.51 | III plus VII |
| D | do | 90–91° (heptane) | 72.69 | 9.71 | 4.41 | 72.83 | 9.54 | 4.35 | II plus V. |
| E | do | 62.5–63° (heptane) | 74.02 | 10.19 | 3.95 | 74.38 | 10.24 | 3.94 | II plus VI. |
| F | do | 61–76° (purified by chromatography). | | | | | | | I plus VIII plus II. |
| G | do | 56–64° (purified by chromatography). | | | | | | | I plus VIII plus III. |
| H | do | 79–87° (heptane) | 69.71 | 8.43 | 5.47 | 69.64 | 8.77 | 5.48 | III plus VII |
| I | do | 133–137° (heptane) | 70.08 | 8.57 | 5.35 | 69.88 | 8.55 | 5.35 | III plus IX. |
| J | do | 78–82° (heptane) | 70.44 | 8.70 | 5.22 | 70.36 | 8.65 | 5.19 | II plus X. |
| K | do | 68–72° (hexane) | 70.77 | 8.83 | 5.11 | 70.90 | 9.14 | 5.21 | III plus X. |
| L | do | 74–84° (purified by chromatography). | 68.77 | 8.32 | 5.40 | 69.29 | 7.67 | 5.33 | II plus XI. |
| M | do | 74–84° (purified by chromatography). | | | | | | | II plus XII. |
| N | do | 70–80° (heptane) | | | | | | | III plus XII. |

The products set out in the above Table I are identified as follows:

| Product | Structural formula | Name of product |
|---|---|---|
| A | $C_8H_{17}S\ CHCOOR_0$ <br>             $\|$ <br>             $CH_2COOR_0$ | Bis(3,5-di-tert-butyl-4-hydroxyphenyl)-2-(n-octylthio) succinate. |
| B | $C_8H_{17}S\ CH_2CHCOOR_0$ <br>                 $\|$ <br>                 $CH_2COOR_0$ | Bis(3,5-di-tert-butyl-4-hydroxyphenyl)-2-(n-octylthiomethyl)succinate. |
| C | $C_6H_5(CH_2)_3S\ CH_2CHCOOR_0$ <br>                     $\|$ <br>                     $CH_2COOR_0$ | Bis(3,5-di-tert-butyl-4-hydroxyphenyl)-2-(3-phenyl-n-propylthiomethyl)succinate. |
| D | $C_{12}H_{25}SCHCOOR_0$ <br>             $\|$ <br>             $CH_2COOR_0$ | Bis(3,5-di-tert-butyl-4-hydroxyphenyl)-2-(n-dodecylthio)succinate. |
| E | $C_{18}H_{37}SCHCOOR_0$ <br>             $\|$ <br>             $CH_2COOR_0$ | Bis(3,5-di-tert-butyl-4-hydroxyphenyl)-2-n-octadecylthio)succinate. |
| F | $R_0OCOCH_2CH_2SCH_2CH_2SCHCOOR_0$ <br>                                       $\|$ <br>                                         $CH_2COOR_0$ | Bis(3,5-di-tert-butyl-4-hydroxyphenyl)-2-(3,5-di-tert-butyl-4-hydroxyphenoxycarbonylethylthioethylthio)succinate. |
| G | $R_0OCOCH_2CH_2SCH_2CH_2SCH_2CHCOOR_0$ <br>                                           $\|$ <br>                                           $CH_2COOR_0$ | Bis(3,5-di-tert-butyl-4-hydroxyphenyl)-2-(3,5-ditert-butyl-4-hydroxyphenoxycarbonylethylthioethylthiomethyl)succinate. |
| H | $\left[\begin{array}{l}R_0OCOCHCH_2SCH_2-\\R_0OCOCH_2\end{array}\right]_2$ | Tetrakis(3,5-di-tert-butyl-4-hydroxyphenyl)-2,2'-(ethylenebisthio)disuccinate. |
| I | $\left[\begin{array}{l}R_0OCOCHCH_2SCH_2CH_2-\\R_0OCOCH_2\end{array}\right]_2$ | Tetrakis(3,5-di-tert-butyl-4-hydroxyphenyl)-2,2'-[tetramethylene-bis(thiomethyl)]disuccinate. |
| J | $\left[\begin{array}{l}R_0OCOCHS(CH_2)_4-\\R_0OCOCH_2\end{array}\right]_2$ | Tetrakis(3,5-di-tert-butyl-4-hydroxyphenyl)-2,2'-(octamethylenebisthio)disuccinate. |
| K | $\left[\begin{array}{l}R_0OCOCHCH_2S(CH_2)_4-\\R_0OCOCH_2\end{array}\right]_2$ | Tetrakis(3,5-di-tert-butyl-4-hydroxyphenyl)-2,2'-[octamethylenebis(thiomethyl)]disuccinate. |
| L | $\left[\begin{array}{l}R_0OCOCHSCH_2CH_2-\\R_0OCOCH_2\end{array}\right]_2-O-$ | Tetrakis(3,5-di-tert-butyl-4-hydroxyphenyl)-2,2'-[oxybis(ethylthio)]disuccinate. |
| M | $\left[\begin{array}{l}R_0OCOCHSCH_2CH_2-\\R_0OCOCH_2\end{array}\right]_2-S-$ | Tetrakis(3,5-di-tert-butyl-4-hydroxyphenyl)-2,2'-[thiobis(ethylthio)]disuccinate. |
| N | $\left[\begin{array}{l}R_0OCOCHCH_2SCH_2CH_2-\\R_0OCOCH_2\end{array}\right]_2-S-$ | Tetrakis(3,5-di-tert-butyl-4-hydroxyphenyl)-2,2'-[thiobis(ethylthiomethyl)]disuccinate. |

In the above formulae, $R_0$ is as defined supra.

The oxidation of most polymers is so slow at ambient temperatures, even in the absence of antioxidants, that testing of the effects of antioxidants must necessarily be conducted at high temperatures in order to yield results within a convenient period of time. The tests conducted on the materials listed in the following table were conducted in a tubular oven with an airflow of 400' per minute at an oven temperature of 150° C. The oven ageing is set out in hours.

In preparing the sample for testing, unstabilized polypropylene powder is thoroughly blended with the indicated antioxidant. The blended material is thereafter milled on a two-roller mill at a temperature of 182° C. for six minutes after which time the stabilized polypropylene is sheeted from the mill and allowed to cool. The milled polypropylene sheet which has been stabilized is then cut into small pieces and pressed for seven minutes on a hydraulic press at 218° C. and 174 p.s.i. pressure. The resultant sheet of 25 mil thickness is then tested for resistance to accelerated ageing in the above described tubular oven.

TABLE II.—EVALUATION OF NOVEL ANTIOXIDANTS IN POLYPROPYLENE (25 MIL), TUBULAR OVEN, 150° C.

| Product | Hours to fail | |
|---|---|---|
| | 0.25% antioxidant | 0.1% antioxidant plus 0.3% DSTDP [1] |
| A | 1,100 | 1,370 |
| B | 1,125 | 1,315 |
| C | 945 | 1,070 |
| D | 1,430 | 1,770 |
| E | 1,820 | 2,100 |
| F | 1,000 | 1,500 |
| G | 820 | 1,480 |
| H | 660 | 1,340 |
| I | 430 | 1,000 |
| J | 840 | 1,460 |
| K | 520 | 1,000 |
| L | 780 | 1,590 |
| M | 780 | 1,590 |
| N | 820 | 1,440 |

[1] DSTDP is distearylthiodipropionate (a synergist for antioxidants

Besides activity in the oven ageing test, the novel antioxidants of the present invention are characterized by excellent color values (no discoloration during the oven ageing test) and good gas fading properties.

The present antioxidants are useful in protecting synthetic polymers such as polypropylene against oxidation in air, thermal degradation or deterioration by including in such substances, a stabilizing amount of the oxidant which will vary between about 0.05 and about 5% and preferably, from about 0.1 to about 0.5%. The antioxidant can be incorporated into the synthetic polymers using conventional procedures. For example, the antioxidants of the present invention are incorporated into the material to be stabilized by any suitable means such as by milling the antioxidant on hot or cold mill rolls, by mixing it in by the use of a Banbury mixer or other well-known devices of this nature or the antioxidant may be mixed with a polyolefin material in the form of molding powder and incorporated during extrusion or prior to extrusion or during injection molding. The antioxidant may even be incoporated into a solution of the polyolefin material and the solution may then be employed for the formation of films, for wet or dry spinning of fibers, monofilament and the like.

The examples set out above are to be considered as illustrative of the present invention and are not to be considered as restrictive. It is therefore to be understood that the invention is not limited to the specific embodiments set out above except as defined in the appended claims.

What is claimed is:
1. Compound of the formula

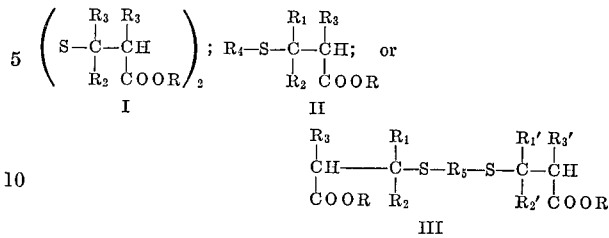

wherein R is

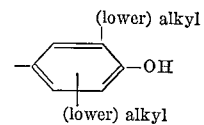

$R_1, R_2, R_3$
$R'_1, R'_2, R'_3$
are each —H, lower alkyl, phenyl, benzyl wherein the alkyl chain has up to 3 carbon atoms, or —$C_mH_{2m}COOR$, where $m$ is 0 to 6;

$R_4$ is —$C_nH_{2n+1}$ where $n$ is 1 to 24, cyclohexyl, phenyl, benzyl wherein the alkyl chain has up to 3 carbon atoms, or —$(CH_2)_y$—COO-alkyl, -phenyl or -benzyl, where $y$ is 1 or 2 and the alkyl has 1 to 24 carbon atoms;

$R_5$ is —$C_nH_{2n}$ where $n$ is 2 to 12,

—$CH_2CH_2OCH_2CH_2$—

—$CH_2$—$CH_2$—$S$—$CH_2$—$CH_2$—,

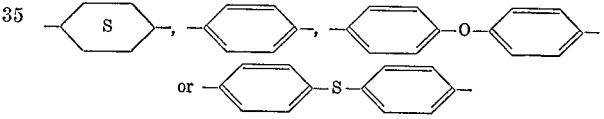

with the proviso that in compounds of Formulae I and II supra, at least one of the substituents $R_1$, $R_2$ or $R_2$ must be —$C_mH_{2m}COOR$ and in compounds of Formula III supra, at least one of the substituents $R_1$, $R_2$, $R_3$, $R'_1$, $R'_2$ or $R'_3$ must be —$C_mH_{2m}COOR$, and wherein the phenyl and benzyl groups may be substituted by a halogen, alkyl having up to 4 carbon atoms, alkoxy having up to 4 carbon atoms, hydroxyl or alkylthio group having up to 6 carbon atoms.

2. An antioxidant compound as claimed in claim 1 wherein R is

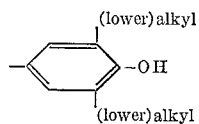

3. An antioxidant compound as claimed in claim 1 wherein, in the group —$C_mH_{2m}COOR$, $m$ is 0 or 1.
4. An antioxidant compound as claimed in claim 1 wherein, in the group —$C_nH_{2n+1}$, $n$ is 8 to 18.
5. An antioxidant compound as claimed in claim 1 which is bis(3,5-di-tert-butyl-4-hydroxyphenyl)2-(n-dodecylthio)succinate.
6. An antioxidant compound as claimed in claim 1 which is bis(3,5-di-tert-butyl-4-hydroxyphenyl)2-(n-octadecylthio)succinate.
7. An antioxidant compound as claimed in claim 1 which is bis(3,5-di-tert-butyl-4-hydroxyphenyl)2-(3,5-ditert - butyl-4-hydroxyphenoxycarbonylethylthioethylthio) succinate.
8. An antioxidant compound as claimed in claim 1 which is bis(3,5-di-tert-butyl-4-hydroxyphenyl)2-(3,5-ditert-butyl - 4-hydroxyphenoxycarbonylethylthioethylthiomethyl)-succinate.

9

9. An antioxidant compound as claimed in claim 1 which is tetrakis(3,5-di-tert-butyl-4-hydroxyphenyl)2,2'-[thio-bis(ethylthio)]disuccinate.

References Cited

UNITED STATES PATENTS

| | | | |
|---|---|---|---|
| 2,551,813 | 5/1951 | Pinkney | 260—609 |
| 2,930,815 | 3/1960 | Nedwick et al. | 260—609 |
| 3,294,836 | 12/1966 | Peterson et al. | 260—479 |
| 3,376,348 | 4/1968 | Stratton | 260—609 |

OTHER REFERENCES

Reid Organic Chemistry of Bivalent Sulfur, vol. II, Chem. Pub. Co., Inc., New York (1960), pp. 29–34.

JAMES A. PATTEN, Primary Examiner

U.S. Cl. X.R.

252—404; 260—45.85, 468 R, 470, 473, 537 S

UNITED STATES PATENT AND TRADEMARK OFFICE
CERTIFICATE OF CORRECTION

PATENT NO. : 3,637,809
DATED : January 25, 1972
INVENTOR(S) : Eduard K. Kleiner

It is certified that error appears in the above-identified patent and that said Letters Patent are hereby corrected as shown below:

Table I, line C, under Calculated Column, Hydrogen "9.46" should read -- 8.46 --.

Table I, line D, under Calculated Column, Carbon "72.69" should read -- 72.68 --.

Claims 2-9, line, "An antioxidant compound" should read -- A compound --.

Signed and Sealed this

Twentieth Day of September 1977

[SEAL]

Attest:

RUTH C. MASON
Attesting Officer

LUTRELLE F. PARKER
Acting Commissioner of Patents and Trademarks